United States Patent
Braga et al.

(10) Patent No.: US 10,769,187 B2
(45) Date of Patent: *Sep. 8, 2020

(54) CROWDSOURCED TRAINING OF TEXTUAL NATURAL LANGUAGE UNDERSTANDING SYSTEMS

(71) Applicant: DefinedCrowd Corporation, Seattle, WA (US)

(72) Inventors: Daniela Braga, Seattle, WA (US); Joao Freitas, Lisbon (PT); Daan Baldewijns, Lisbon (PT)

(73) Assignee: DefinedCrowd Corporation, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/694,856

(22) Filed: Nov. 25, 2019

(65) Prior Publication Data
US 2020/0089698 A1  Mar. 19, 2020

Related U.S. Application Data

(63) Continuation of application No. 15/815,165, filed on Nov. 16, 2017, now Pat. No. 10,528,605.

(60) Provisional application No. 62/424,324, filed on Nov. 18, 2016.

(51) Int. Cl.
*G06F 16/332* (2019.01)
*G06K 9/62* (2006.01)
*G06N 5/02* (2006.01)

(52) U.S. Cl.
CPC ....... *G06F 16/3329* (2019.01); *G06K 9/6253* (2013.01); *G06N 5/025* (2013.01)

(58) Field of Classification Search
CPC ....... G10L 15/08; G10L 15/063; G10L 13/08; G10L 2015/0638; G10L 2015/0633; G06F 3/01; G06F 17/28; G06F 17/27; G06F 17/30
See application file for complete search history.

(56) References Cited

U.S. PATENT DOCUMENTS

| | | | | |
|---|---|---|---|---|
| 9,430,463 | B2* | 8/2016 | Futrell | G06F 17/2211 |
| 9,953,088 | B2* | 4/2018 | Gruber | G06F 16/9535 |
| 1,017,616 | A1 | 1/2019 | Evermann | |
| 10,176,167 | B2* | 1/2019 | Evermann | G06F 17/279 |
| 1,019,905 | A1 | 2/2019 | Binder et al. | |
| 10,199,051 | B2* | 2/2019 | Binder | G10L 17/24 |

(Continued)

*Primary Examiner* — Mohammad K Islam
(74) *Attorney, Agent, or Firm* — Perkins Coie LLP

(57) ABSTRACT

A facility to crowdsource training of virtual assistants and other textual natural language understanding systems is described. The facility first specifies a set of possible user intents (e.g., a kind of question asked by users). As part of specifying an intent, entities, that represent salient items of information associated with the intent are identified. Then, for each of the intents, the facility directs users of a crowdsourcing platform to input a number of different textual queries they might use to express this intent. Then, additional crowdsourcing platform users are asked to perform semantic annotation of the cleaned queries, for each selecting its intent and entities from predefined lists. Next, still other crowdsourcing platform users are asked whether the selection of intents and entities during semantic annotation was correct for each query. Once validated, the annotated queries are used to train the assistant.

19 Claims, 9 Drawing Sheets

(56) References Cited

U.S. PATENT DOCUMENTS

| | | | |
|---|---|---|---|
| 1,022,306 A1 | 3/2019 | Martel et al. | |
| 10,223,066 B2* | 3/2019 | Martel | G06F 3/167 |
| 1,052,860 A1 | 1/2020 | Braga et al. | |
| 2016/0188738 A1* | 6/2016 | Gruber | G06F 16/9535 |
| | | | 707/722 |
| 2017/0160813 A1* | 6/2017 | Divakaran | G06F 3/017 |
| 2017/0359464 A1* | 12/2017 | Segalis | G06N 20/00 |
| 2018/0314689 A1* | 11/2018 | Wang | G10L 15/1822 |

* cited by examiner

CROWDSOURCED TRAINING OF TEXTUAL NATURAL LANGUAGE UNDERSTANDING SYSTEMS

CROSS-REFERENCE TO RELATED APPLICATION(S)

This application is a continuation of U.S. patent application Ser. No. 15/815,165 entitled "CROWDSOURCED TRAINING OF TEXTUAL NATURAL LANGUAGE UNDERSTANDING SYSTEMS," filed on Nov. 16, 2017, now U.S. Pat. No. 10,528,605, which claims the benefit of U.S. Provisional Patent Application No. 62/424,324 entitled "CROWDSOURCED TRAINING OF TEXTUAL NATURAL LANGUAGE UNDERSTANDING SYSTEMS," filed on Nov. 18, 2016, both of which are incorporated herein by reference in their entireties.

BACKGROUND

Natural language understanding is an Artificial Intelligence process of assigning meaning to natural language text. This process can be relevant to the design and operation of a chatbot or a virtual assistant, which exchanges textual messages with a user, sometimes taking actions on behalf of the user that extends beyond participation in the conversation.

DETAILED DESCRIPTION

Figure 1:
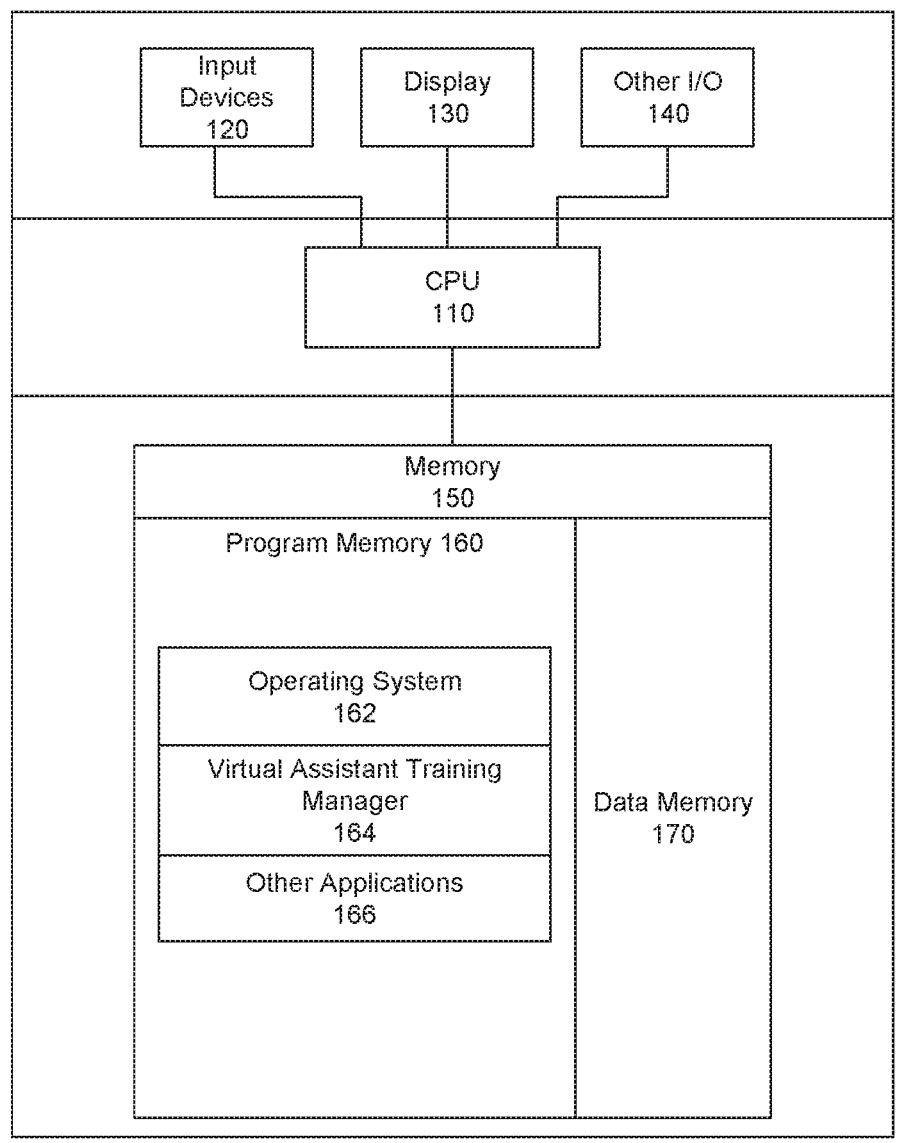
FIG. 1 is a block diagram showing some of the components typically incorporated in computer systems and other devices on which the facility operates.

The inventors have recognized that many virtual assistants are implemented with a certain rigidity about the ways in which a user can express an intent, limiting their usability. Also, many conventional virtual assistants are trained based exclusively on input from their designers, increasing the cost and implementation time for such virtual assistants.

To address these disadvantages observed by the inventors in the conventional approach to implementing virtual assistants discussed above, they have conceived and reduced to practice a software and/or hardware facility to crowdsource training of virtual assistants and other textual natural language understanding systems ("the facility"). In various embodiments, the facility uses a variety of combinations of one or more crowdsourcing platforms for employing and interacting with crowdsourced workers; these crowdsourcing platforms can include both platforms operated by the operator of the facility and platforms operated by third parties.

The facility generates, for each of a number of intents, a diverse set of cleaned queries that express the intent, in which entities are labeled. In various embodiments, these queries can be used to train a virtual assistant, such as a rule-based virtual assistant and/or a statistical model-based virtual assistant.

The assistant is first defined by specifying a set of possible user intents—a kind of question that users are likely to pose, or a kind of task that users are likely to wish to perform. For example, an airline may specify for its assistant the intent of making a flight reservation between two cities. As part of specifying an intent, "entities" or "slots" associated with the intent are identified: salient items of information that can vary between different queries that are addressed to this intent. The airline would identify two entities for the making a flight reservation intent: origin city and destination city.

After the assistant is defined by specifying a number of different intents and the associated entities, for each of the intents, the facility directs users of a crowdsourcing platform to input a number of different textual queries they might use to express this intent. For example, for the making a flight reservation intent, users may be prompted to "input five different queries you might type when you want to arrange a flight from Milwaukee to Phoenix." These queries inputted for the intent are subjected to data cleaning, such as correcting spelling, capitalization, punctuation, grammar, or performing text normalization, for example. Each aspect of data cleaning can be performed automatically using tools, or manually by a different crowdsourcing platform user. Then, additional crowdsourcing platform users are asked to perform semantic annotation of the cleaned queries, for each selecting its intent and entities from predefined lists. Next, still other crowdsourcing platform users are asked whether the selection of intents and entities during semantic annotation was correct for each query. In some embodiments, the facility presents each entity query to multiple crowdsourcing platform users for validation.

Once validated, the annotated queries are used to train the assistant. For an assistant whose AI uses statistical techniques, a statistical model—such as a forest of classifying decision trees or a neural network—that predicts from a textual query its intent and entities is trained using the annotated queries as observations. For an assistant whose AI uses rule-based techniques, each validated annotated query is added to a pool of textual queries that will be recognized as expressing the intent and entities indicated by the query's annotations. When a query is received from an actual user, the assistant's AI is used to automatically select the intent and entities to which the query is directed, and the assistant acts on this intent and these entities, such as by responding with a list of flights from Milwaukee to Phoenix, or by asking when the user would like to travel.

By performing some or all of the ways described above, the facility enables a virtual assistant to be quickly and inexpensively trained, and easily extended to handle new user intents.

Description of Figures

The following description provides certain specific details of the illustrated examples. One skilled in the relevant art will understand, however, that embodiments can be practiced without many of these details. Likewise, one skilled in the relevant art will also understand that the present disclosure can include many other obvious features not described in detail herein. Additionally, some well-known structures or functions may not be shown or described in detail below, to avoid unnecessarily obscuring the relevant descriptions of the various examples.

Several implementations are discussed below in more detail in reference to the figures. Turning now to the figures, FIG. 1 is a block diagram showing some of the components typically incorporated in computer systems and other devices on which the facility operates. The devices can comprise hardware components of a device 100 that implements an incremental mount framework. Device 100 can include one or more input devices 120 that provide input to the CPU(s) (processor) 110, notifying it of actions. The actions can be mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some embodiments, the device 100 includes a communication device 135 capable of communicating with a network node. The communication device communicates with another device or a server through a network using, for example, TCP/IP protocols. The device 100 can utilize the communication device 135 to distribute operations across multiple network devices to send and/or receive data, such as via the Internet or another network and its networking hardware, such as switches, routers, repeaters, electrical cables and optical fibers, light emitters and receivers, radio transmitters and receivers, and the like.

The CPU 110 can have access to a memory 150 in a device or distributed across multiple devices. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, virtual assistant training manager 164, and other application programs 166. Memory 150 can also include data memory 170 that can include user data such as profile(s) (e.g., administrator, consumer, web developer, etc.), project(s) (e.g., travel portal, customer care for cellular service, etc.), intent(s) (e.g., make a flight reservation, cancel a flight reservation, etc.), queries (e.g., how do I get from A to B, what flight options will get me to B from A, etc.), and entities (e.g., origin city, destination city, etc.), etc., which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
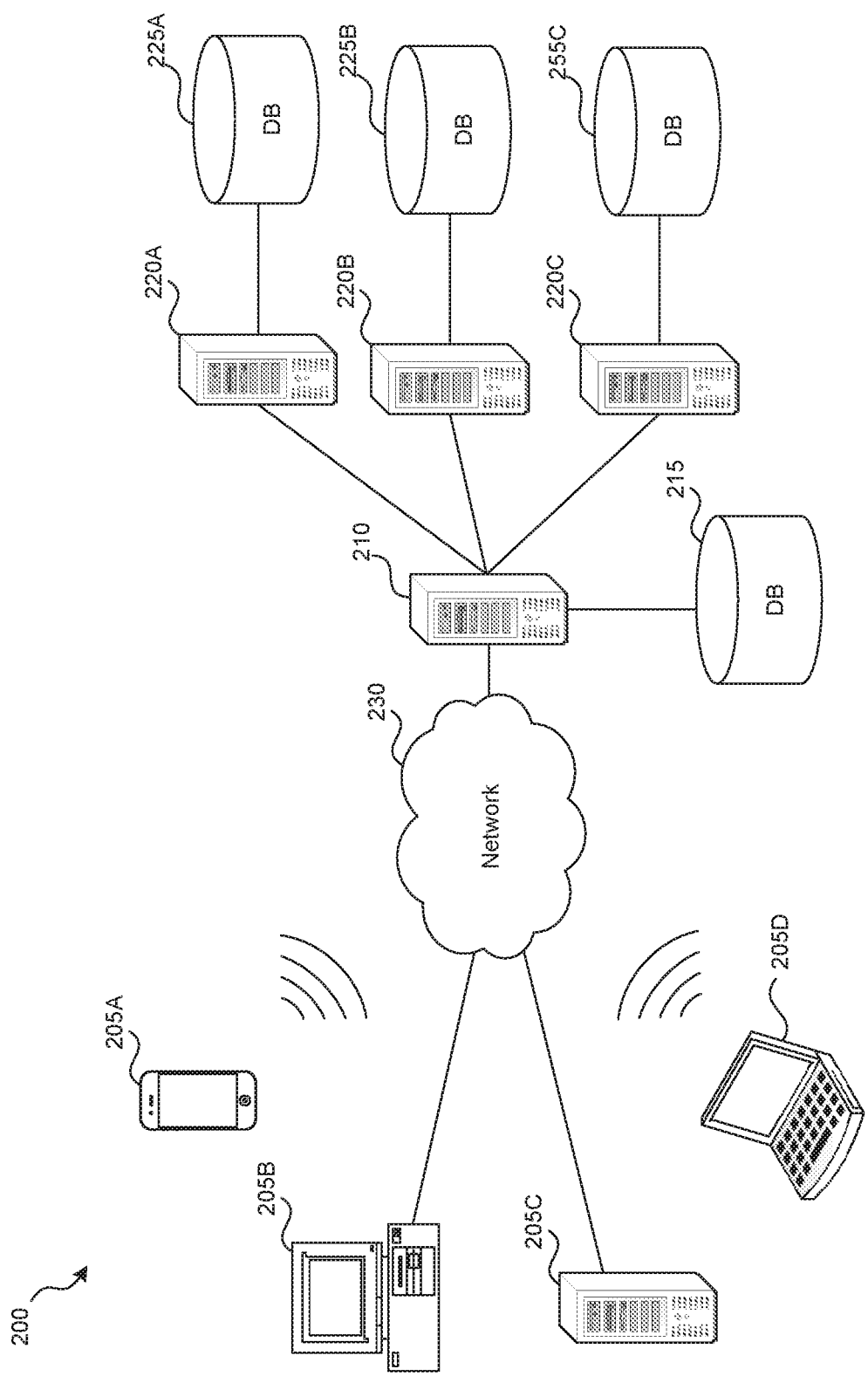
FIG. 2 is a system diagram illustrating an example of a computing environment in which the facility is utilized in some embodiments.

FIG. 2 is a system diagram illustrating an example of a computing environment in which the facility can be utilized. Environment 200 can include one or more client computing devices 205A-D, examples of which can include device 100. Client computing devices 205 can operate in a networked environment using logical connections 210 through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as profile(s) (e.g., administrator, consumer, web developer, etc.), project(s) (e.g., travel portal, customer care for cellular service, etc.), intent(s) (e.g., make a flight reservation, cancel a flight reservation, etc.), queries (e.g., how do I get from A to B, what flight options will get me to B from A, etc.), and entities (e.g., origin city, destination city, etc.), etc. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
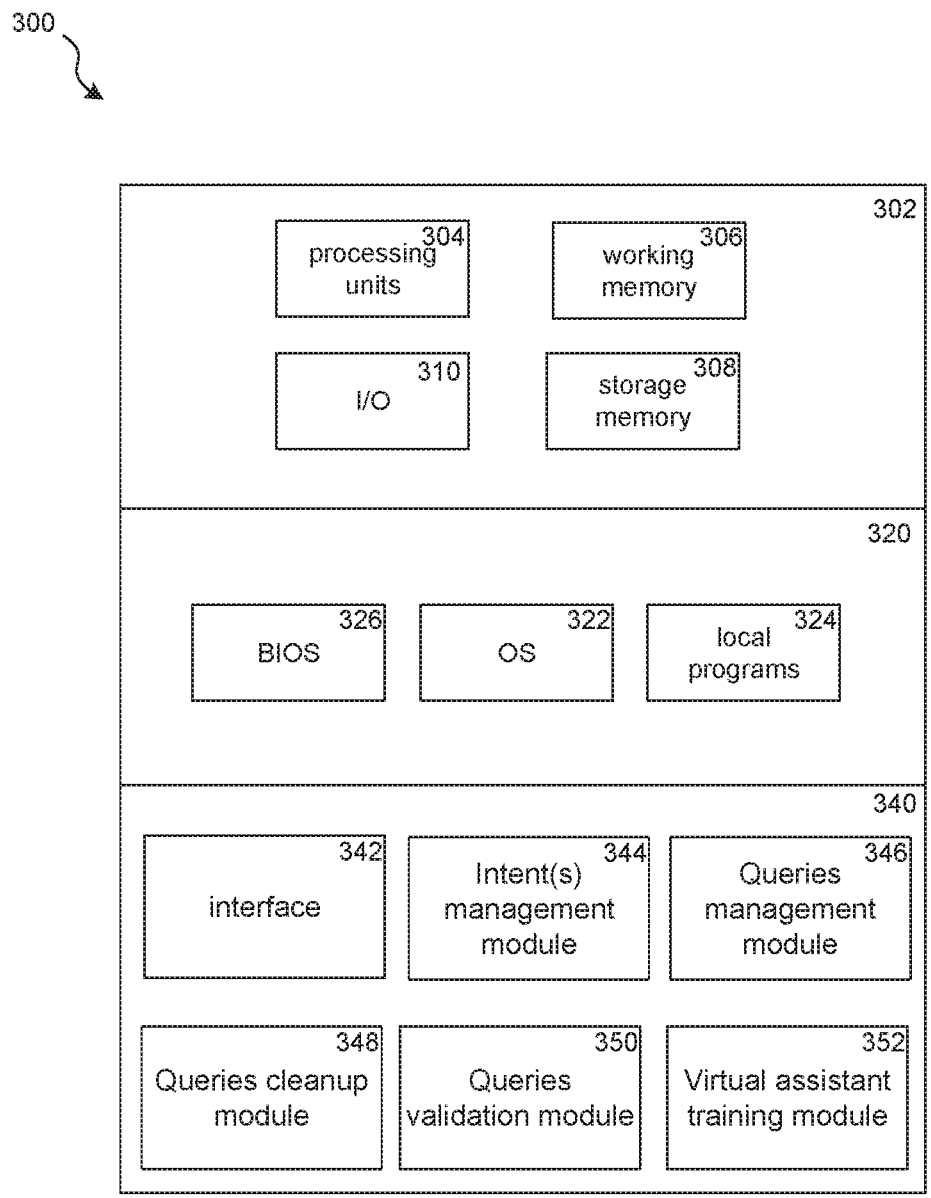
FIG. 3 is a display diagram illustrating components of the facility in accordance with some embodiments.

FIG. 3 is a display diagram illustrating components of the facility in accordance with some embodiments. The facility 300 includes hardware 302, general software 320, and specialized components 340. As discussed above, the facility 300 can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). The facility 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include intent(s) management module 344, queries management module 346, queries cleanup module 348, queries validation module 350, virtual assistant training module 352, and components which can be used for transferring data and controlling the specialized components, such as interface 342. In some implementations, the facility 300 can be in a computing system that is distributed across multiple computing devices or can be an interface to a server-based application executing one or more of specialized components 340.

In some embodiments, the intent(s) management module 344 is configured and/or programmed to manage a set of possible user intents, which, as discussed above, represent a kind of question that users are likely to pose, or a kind of task that users are likely to wish to perform. In some embodiments, intents may be associated with a project and a scenario. Projects may represent, for example, a solution or a theme for which the facility provides virtual assistant support. Examples of projects include, but are not limited to, telecommunications service provider, travel portal, e-commerce application, health insurance provider, etc. A project may be associated with one or more scenarios that represent various capabilities of the project. For example, a company may specify for its facility the following scenarios for a travel portal project: flight reservation, hotel reservation, rental car reservation, cruise reservation, etc. Similarly, a company may specify for its facility the following scenarios for a health insurance provider project: appointments, laboratory work, general inquiries, etc.

For each scenario, the intent(s) management module 344 manages one or more intents. For example, for a flight reservation scenario, the intent(s) management module 344 may manage the following intents: make a flight reservation, update a flight reservation, cancel a flight reservation, confirm a flight reservation, etc. For an appointment scenario, the intent(s) management module 344 may manage the following intents: make an appointment, confirm an appointment, reschedule an appointment, cancel an appointment, etc.

Intent(s) may be classified with varying degrees of complexity based on, for example, the number of steps performed, the number of actors involved, etc. to perform the intent. For example, an intent of canceling a flight reservation can be classified as having a higher complexity than an intent of making a flight reservation because cancelling a reservation involves the additional steps of requesting an existing reservation number, retrieving information of the existing reservation, computing any penalties associated with cancelling, etc. An intent's complexity may be determined using a numerical scale (e.g., from 1 to 10 with 10), a verbal scale (e.g., low, medium, complex), etc.

As part of specifying an intent, the intent(s) management module 344 may also manage associated entities or slots. As discussed above, entities or slots represent salient items of information that are associated with an intent. For example, the facility identifies two entities for the making a flight reservation intent: origin city and destination city. In some embodiments, the number of entities associated with an intent may be based on the complexity of the intent. An entity may be associated with multiple intents. For example, the entity origin city may be associated with the following intents: making a flight reservation, canceling a flight reservation, and updating a flight reservation.

In some embodiments, the queries management module 346 is configured and/or programmed to manage queries used to express an intent. Users may specify textual queries and associate them with an intent. For example, for the making a flight reservation intent, the facility prompts a first set of users to "input five different queries you might type when you want to arrange a flight from Milwaukee to Phoenix." The user may enter the following queries in response: "How Do i get from Milwakee to Phenix," "What flights can I take to get from Milwaukee to Phoenix," "What options to go from Milwak to PHX," "Give me flight options between MKE and PHX," and "Tell me about getting to Phenex from Milwaukee." In some embodiments, the queries management module 346 may access a database to retrieve one or more pre-defined queries to associate with an intent. For example, the queries management module 346 may retrieve queries that have been saved previously for an intent. In some embodiments, the queries management module 346 may analyze an intent to identify other similar intents, and then identify (and/or retrieve) queries associated with the identified similar intents. The facility then presents these queries to users for their review and selection. A query may be associated with multiple intents. For example, the query "How do I get from Milwaukee to Phoenix" is associated with the following intents: making a flight reservation, and making a car reservation.

In some embodiments, the queries cleanup module 348 is configured and/or programmed to clean the queries associated with an intent. For example, the queries management module 346 corrects spelling, capitalization, punctuation, and grammar, performs text normalization, etc. Each aspect of data cleaning can be performed automatically by the queries management module 346 using tools (e.g., spelling corrector, grammar corrector, etc.), or manually by one or more users (e.g., a second set of users). For example, the queries management module 346 can correct the queries inputted for the making a flight reservation intent to produce the following set of cleaned queries: "How do I get from Milwaukee to Phoenix," "What flights can I take to get from Milwaukee to Phoenix," "What options to go from Milwaukee to Phoenix," "Give me flight options between Milwaukee to Phoenix," and "Tell me about getting to Phoenix from Milwaukee."

In some embodiments, the queries validation module 350 is configured and/or programmed to validate the cleaned queries. For example, the facility presents the cleaned queries to a third set of users who can then perform semantic annotation of the cleaned queries, for each selecting its intent and entities from predefined lists (as discussed in detail in reference to FIG. 6 below). The facility can also present the selected intents and entities to a fourth set of users who can validate that the selection of intents and entities during semantic annotation was correct for each query. In some embodiments, the facility presents each entity query to multiple crowdsourcing platform users for validation. It will be understood that the different sets of users (e.g., the first set of users, second set of users, third set of users, etc.) comprise same or different users (e.g., the sets may be overlapping or disjoint). Users in the different sets (e.g., the first set of users, second set of users, third set of users, etc.) may be selected at random, and/or based upon one or more factors such as their experience, expertise, and/or affiliation with a project, scenario, and/or intent, accuracy of their past interactions with the facility, ratings (user ratings and/or system ratings), etc.

In some embodiments, the virtual assistant training module 352 is configured and/or programmed to train a virtual assistant based on the validated and annotated queries. For an assistant whose AI uses statistical techniques, a statistical model—such as a forest of classifying decision trees or a neural network—that predicts from a textual query its intent and entities is trained using the annotated queries as observations. For an assistant whose AI uses rule-based techniques, each validated annotated query is added to a pool of textual queries that will be recognized as expressing the intent and entities indicated by the query's annotations. When a query is received from an actual user, the assistant's AI may be used to automatically select the intent and entities to which the query is directed, and the assistant acts on this intent and these entities, such as by responding with a list of flights from Milwaukee to Phoenix, or by asking when the user would like to travel.

Figure 8:
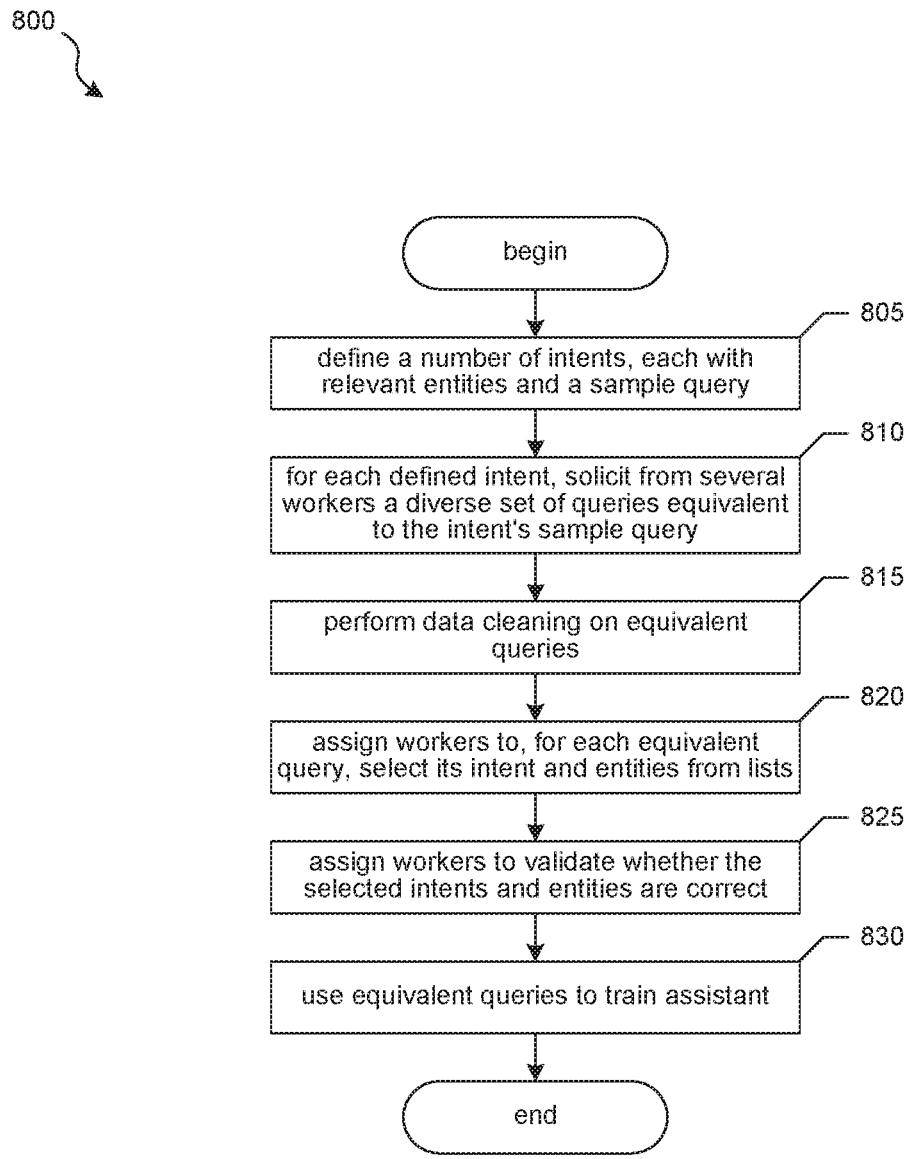
FIG. 8 is a flow diagram showing a process performed by the facility in some embodiments in order to perform crowdsourced semantic annotation.

FIG. 8 is a flow diagram showing a process performed by the facility in some embodiments in order to perform crowdsourced semantic annotation. In act 805, the facility defines a number of user intents to be recognized by the virtual assistant, establishing a sample natural language query expressing each of these user intents. In some embodiments, the facility does so based upon receiving these user intents and sample queries from a designer of the virtual assistant. In various embodiments, the intents defined in act 805 are the first intents defined for the virtual assistant, or are new intents to be recognized by an already-functioning virtual assistant. The intents defined in act 805 may be associated with a project and/or a scenario of the already-functioning virtual assistant.

Figure 4:
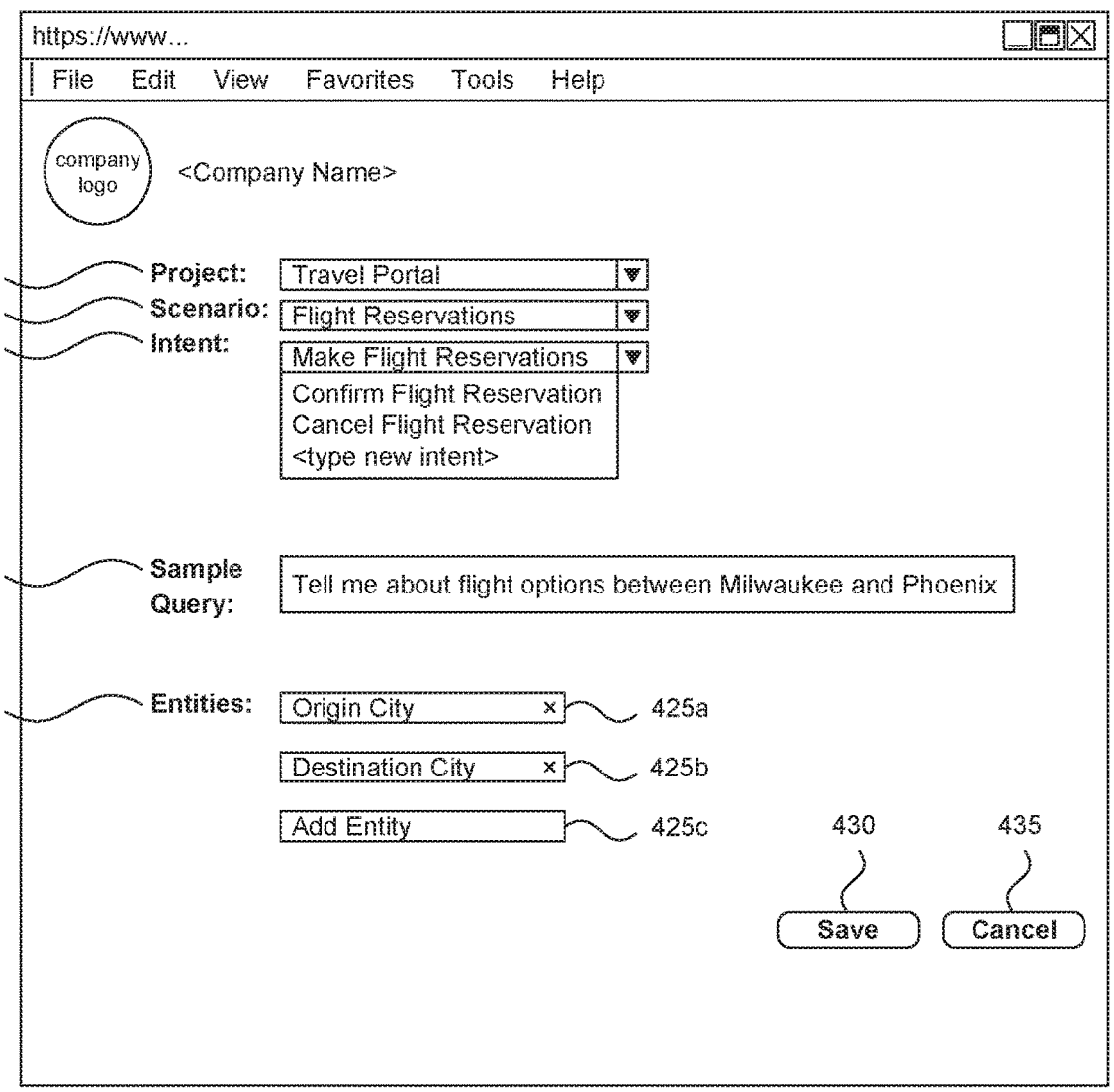
FIG. 4 is a display diagram showing a sample display presented by the facility in some embodiments to solicit information from users regarding intents and entities.

For example, FIG. 4 is a display diagram showing a sample display typically presented by the facility in order to solicit information from users regarding intents and associated sample query and entities. The display 400 contains a number of different controls that may be operated by a user to provide information about a project, scenarios, intents, and entities for a virtual assistant: control 410 for selecting a project (e.g., "Travel Portal"); control 415 for selecting a scenario (e.g., "Flight Reservation"); control 420 for specifying an intent (e.g., "Make Flight Reservation," "Cancel Flight Reservation," "Confirm Flight Reservation," or entering a new intent); control 422 for identifying a sample query for the selected intent ("Tell me about flight options between Milwaukee and Phoenix"); control 425 for identifying one or more entities associated with the selected intent (e.g., "Origin City" 425a, "Destination City" 425b, or entering a new entity 425c); control 430 for saving the changes; and control 435 for canceling the changes. In various embodiments, the facility solicits more, less, or different information in an effort for users to specify intents and entities associated with a project.

Figure 5A:
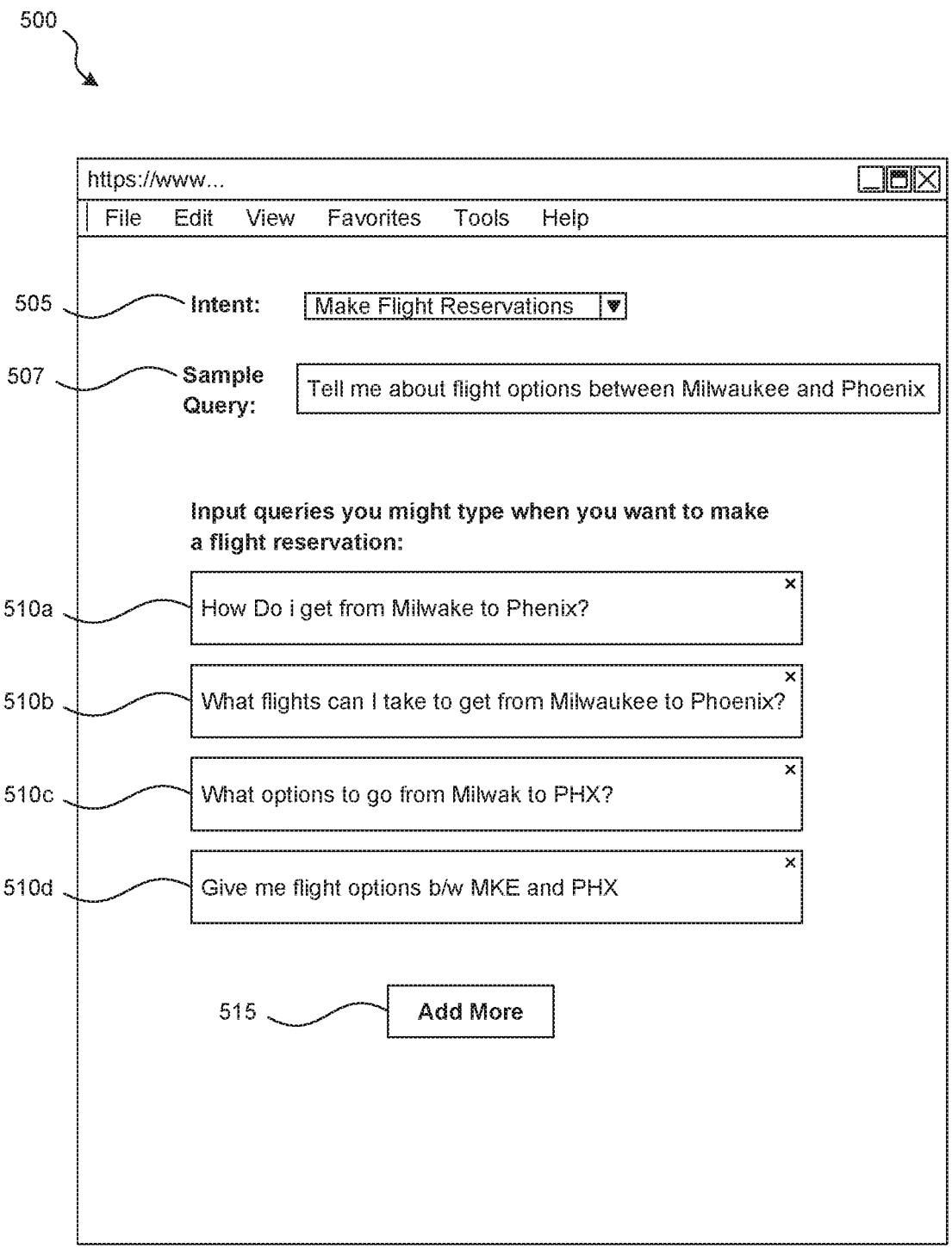
FIGS. 5A-5B are display diagrams showing a sample display presented by the facility in some embodiments to solicit information from users regarding queries associated with an intent.

In act 810, for each intent defined in act 805, the facility solicits from several crowdsourced workers in a first group (a first set of users) queries that are relevant to the intent or equivalent to the intent's sample query. For example, FIG. 5A is a display diagram showing a sample display 500 typically presented by the facility in order to solicit information from users regarding queries associated with an intent. The display 500 contains a number of different controls that may be operated by a user to provide information about an intent: control 505 for selecting an intent (e.g., "Make Flight Reservation"); control 507 for displaying a sample query associated with the selected intent (e.g., entered using control 422 in FIG. 4); and controls 510a-510d for specifying queries relevant to the selected intent (e.g., queries equivalent to the sample query displayed in control 507). For example, a user may select (e.g., from a drop-down list) suggested queries to associate with an intent. A user may type in (e.g., using a freeform textbox) or otherwise specify queries to associate with an intent. For example, a user may select an intent "Make Flight Reservation," and associate the following queries with it: "How Do i get from Milwakee to Phenix," "What flights can I take to get from Milwaukee to Phoenix," "What options to go from Milwak to PHX," and "Give me flight options b/w MKE and PHX." In some embodiments, the display 500 allows a user to correct spelling, capitalization, punctuation, and grammar errors manually or automatically, using one or more tools (e.g., a spell checker textbox).

Figure 5B:
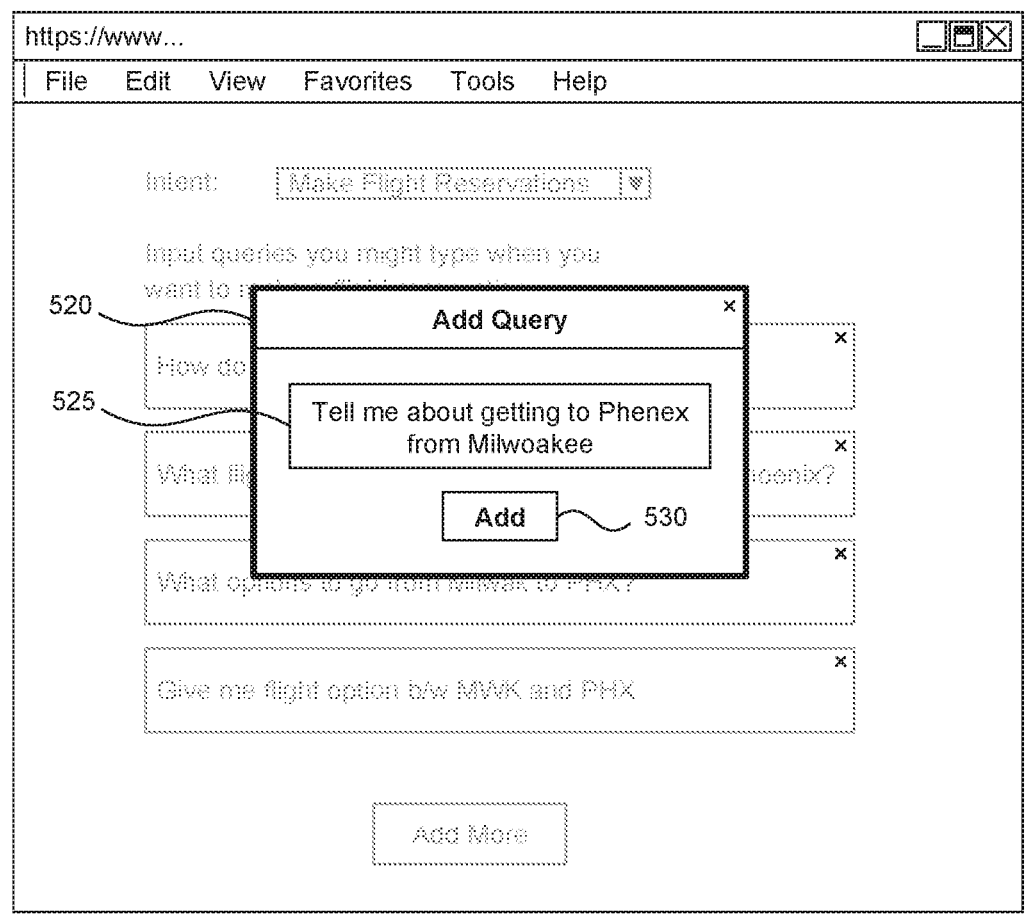

A user may add queries to associate with an intent via control 515. Upon selecting control 515, the user may be presented with an interface (e.g., a pop-up window) as illustrated in FIG. 5B. The facility then window 520 to the user, using which the user can add one or more queries for the selected intent via controls 525 and 530. For example, a user may add the following query to associate with the selected intent of "Make Flight Reservation": "Tell me about getting to Phenex from Milwaakee."

In act 815, the facility performs one or more forms of data cleaning on the equivalent queries obtained in act 810 from the first set of users. In various embodiments, the facility performs the data cleaning of act 815 using automated tools, crowdsourced workers (e.g., a second set of users, bots, etc.), or a combination of these. For example, the facility corrects the queries inputted for the making a flight reservation intent to produce the following set of cleaned queries: "How do I get from Milwaukee to Phoenix," "What flights can I take to get from Milwaukee to Phoenix," "What options to go from Milwaukee to Phoenix," "Give me flight options between Milwaukee to Phoenix," and "Tell me about getting to Phoenix from Milwaukee."

Figure 6:
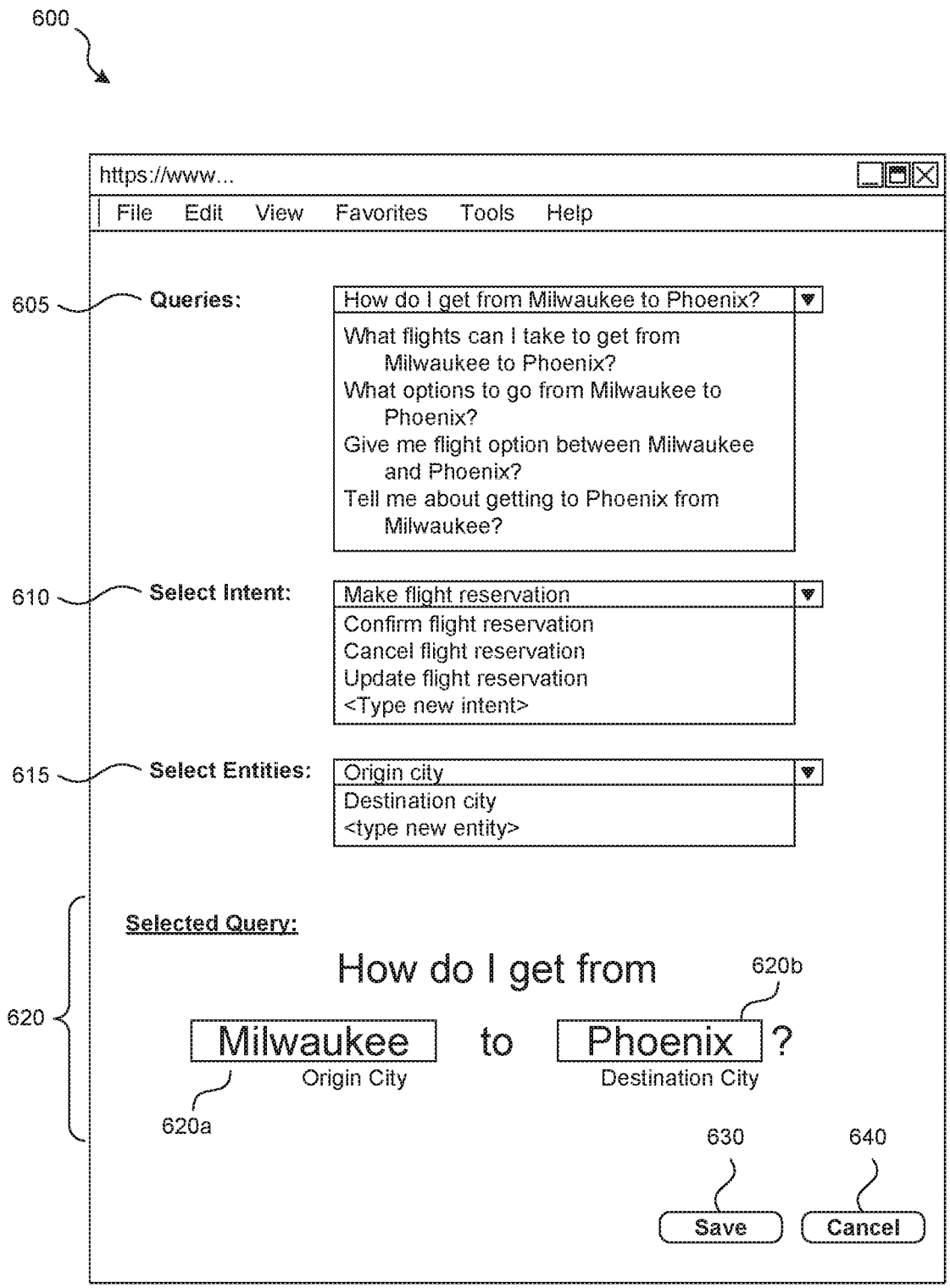
FIG. 6 is a display diagram showing a sample display presented by the facility in some embodiments to solicit information from users regarding intents and entities associated with a query.

After the queries are cleaned, in act 820, the facility assigns users (e.g., a third set of users, bots, etc.) to, for each equivalent query obtained in act 810, select its intent and entities from lists of intents and entities, respectively. For example, FIG. 6 is a display diagram showing a sample display 600 typically presented by the facility in order to solicit information from users regarding intents and entities associated with a query. The display 600 contains a number of different controls that may be operated by a user to provide information about queries: control 605 for selecting a query (e.g., the cleaned queries obtained in act 815); control 610 for selecting an intent of the selected query (e.g., the intents specified in act 805): and control 615 for selecting entities (e.g., the entities selected by the first set of users in act 810). Users in the third set of users may select each query using control 605 and then select an associated intent (via control 610) and associated entities (via control 615). The display 600 may contain control 620 that presents the selected query (from control 605) and allows a user to associate words/phrases in the query with one or more selected entities. For example, a user may associate the words "Milwaukee" 620*a* with the entity "Origin City" and the words "Phoenix" 620*b* with the entity "Destination City." The user may then save the changes using control 630 or cancel any changes using control 640.

Figure 7:
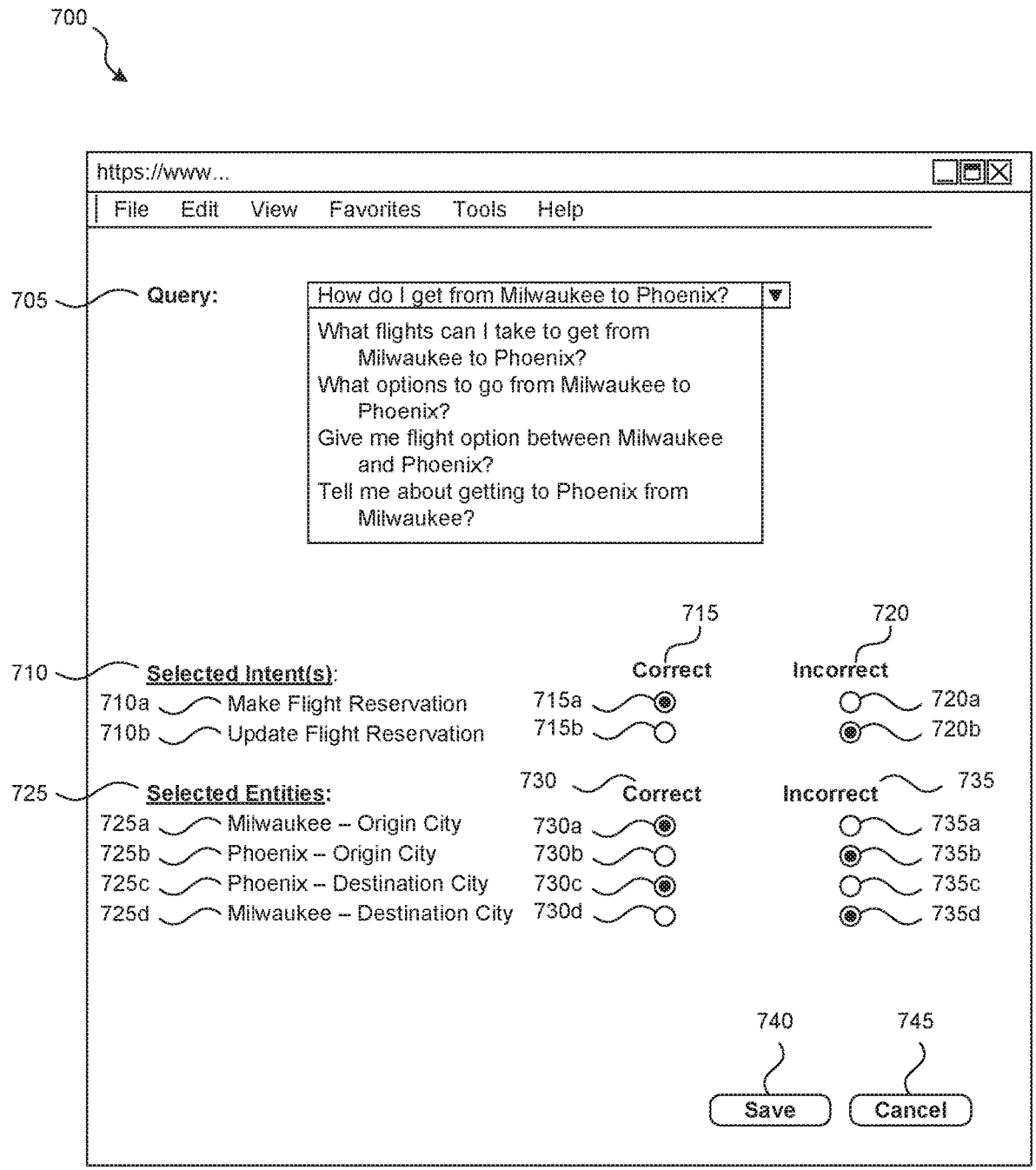
FIG. 7 is a display diagram showing a sample display presented by the facility in some embodiments to solicit information from users regarding validity of queries and their associated intents and entities.

In acts 825, the facility assigns users (e.g., a fourth set of users, bots, etc.) to validate whether the intents and entities selected in act 820 are correct. For example, FIG. 7 is a display diagram showing a sample display 700 typically presented by the facility in order to solicit information from users regarding validity of queries and their associated intents and entities. The display 700 contains a number of different controls that may be operated by a user to provide information about the selected intents and entities associated with a query: control 705 for selecting a query (e.g., the cleaned queries obtained in act 815); controls 710*a*-710*b* for presenting the associated intents (e.g., the intents selected in act 820); controls 715 (715*a*-715*b*) and 720 (720*a*-720*b*) for specifying whether each selected intent is correct or incorrect; controls 725 (725*a*-725*d*) for presenting the associated entities (e.g., the entities selected in act 820); controls 730 (730*a*-730*d*) and 735 (735*a*-735*d*) for specifying whether each selected entity is correct or incorrect; control 740 for saving; and control 745 for cancelling any changes made. For example, a user may select control 715*a* to specify that intent "Make Flight Reservation" is correct, and control 720*b* to specify that intent "Update Flight Reservation" is incorrect for the selected query "How do I get from Milwaukee to Phoenix." Similarly, a user may select control 730*a* to specify that entity "Milwaukee-Origin City" is correct, control 730*c* to specify that entity "Phoenix-Destination City" is correct, control 735*b* to specify that entity "Phoenix-Origin City" is incorrect, and control 735*d* to specify that entity "Milwaukee-Destination City" is incorrect.

In act 830, the facility uses the equivalent queries and their validated intents and entities to train the virtual assistant. After act 830, this process concludes.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

Those skilled in the art will appreciate that the process shown in FIG. 8 may be altered in a variety of ways. For example, the order of the acts may be rearranged; some acts may be performed in parallel; shown acts may be omitted, or other acts may be included; a shown acts may be divided into sub acts, or multiple shown acts may be combined into a single act, etc.

We claim:

1. At least one non-transitory, computer-readable medium carrying instructions, which when executed by at least one data processor, performs operations for training a virtual assistant to operate with respect to a plurality of user intents, the operations comprising:
    defining a set of user intents to be recognized by the virtual assistant,
        wherein each user intent in the set of user intents is associated with: (1) at least one natural language query expressing the user intent, and (2) a set of entities associated with the user intent;
    for at least one user intent in the set of user intents:
        receiving, from a first set of users, a set of queries including at least one of: (1) a query of relevance to the at least one user intent, or (2) an equivalent of the at least one natural language query expressing the at least one user intent;
    for at least one query in the set of queries received from the first set of users:
        assigning a second set of users to specify an annotation including: (1) an intent expressed by the at least one query, and (2) a set of entities associated with the at least one query; and
    generating a training dataset comprising the set of queries received from the first set of users and the annotations specified by the second set of users.

2. The at least one non-transitory, computer-readable medium of claim 1, wherein the operations further comprise:
    receiving, from at least one user among the first set of users, a selection of the at least one user intent in the set of user intents.

3. The at least one non-transitory, computer-readable medium of claim 1, wherein the operations further comprise:
    performing, by a third set of users, at least one form of data cleaning on queries in the set of queries received from the first set of users.

4. The at least one non-transitory, computer-readable medium of claim 1, wherein a size of the set of queries of relevance to the at the least one user intent is based at least in part on a complexity of the at least one user intent.

5. The at least one non-transitory, computer-readable medium of claim 1, wherein the operations further comprise:
    for each worker in a fourth set of crowdsourced users:
        receiving at least one intent validation indicator that represents whether at least a portion of the specified intent associated with the at least one query is correct.

6. The at least one non-transitory, computer-readable medium of claim 1, wherein the operations further comprise:
    for each worker in a fourth set of crowdsourced users:
        receiving at least one validation indicator that represents whether at least one entity in the set of entities associated with the at least one query is correct.

7. A system for training a virtual assistant to operate with respect to a plurality of user intents, the system comprising:
    at least one hardware processor;
    at least one non-transitory memory, coupled to the at least one hardware processor and storing instructions, which when executed by the at least one hardware processor, perform a process, the process comprising:
defining a set of user intents to be recognized by the virtual assistant,
wherein each user intent in the set of user intents is associated with: (1) at least one natural language query expressing the user intent, and (2) a set of entities associated with the user intent;
for at least one user intent in the set of user intents:
receiving, from a first set of users, a set of queries including at least one of: (1) a query of relevance to the at least one user intent, or (2) an equivalent of the at least one natural language query expressing the at least one user intent;
for at least one query in the set of queries received from the first set of users:
assigning a second set of users to specify an annotation including: (1) an intent expressed by the at least one query, and (2) a set of entities associated with the at least one query; and
training the virtual assistant using the set of queries received from the first set of users and the annotations specified by the second set of users.

8. A method in a computing system for training a virtual assistant to operate with respect to multiple user intents, the method comprising:
defining a set of user intents to be recognized by the virtual assistant, each user intent specifying a type of question or task;
sending a user intent in the set of user intents to a first set of users;
after sending the user intent to the first set of users, receiving from each user in the first set of users, a set of natural language queries that each express a question or task of the type specified by the user intent;
sending a natural language query received from a user in the first set of users to a second, different set of users;
after sending the received natural language query to the second set of users, receiving from each user in the second set of users, an annotation of the received natural language query that specifies (1) an intent expressed by the received natural language query and (2) a set of entities associated with the received natural language query;
generating a training dataset comprising the set of natural language queries received from each user in the first set of users and the annotation received from each user in the second set of users; and
training the virtual assistant using the training dataset.

9. The method of claim 8, further comprising:
receiving, from a user among the first set of users, a selection of the user intent in the set of user intents.

10. The method of claim 8, further comprising:
performing a form of data cleaning on queries in the set of natural language queries that are relevant to the at the user intent.

11. The method of claim 10, wherein the form of data cleaning is performed by a third set of users.

12. The method of claim 8, wherein a size of the set of natural language queries is based on a complexity of the user intent.

13. The method of claim 8, further comprising:
for each user in a fourth set of users:
receiving an intent validation indicator that represents whether at least a portion of the intent specified in the annotation is correct.

14. The method of claim 8, further comprising:
for each user in a fourth set of users:
receiving a validation indicator that represents whether an entity in the set of entities specified in the annotation is correct.

15. The method of claim 8, wherein a user in the first set of users and the second set of users is the same.

16. The method of claim 8, wherein a user in each of the first set of users and the second set of users is a person, a bot, or a combination thereof.

17. The method of claim 8, wherein the virtual assistant is a rule-based virtual assistant, and wherein training the virtual assistant comprises adding the received set of natural language queries to a pool of expressions that are recognized as expressing their associated user intents.

18. The method of claim 8, wherein the virtual assistant is a statistical model-based virtual assistant, and wherein training the virtual assistant comprises using the received set of natural language queries and their associated user intents as observations.

19. The method of claim 8, wherein a user intent in the set of user intents is associated with a project or a scenario, wherein the project represents a solution or a theme for which the virtual assistant provides virtual assistant support, and the scenario represents capabilities of the project.

* * * * *

UNITED STATES PATENT AND TRADEMARK OFFICE
CERTIFICATE OF CORRECTION

PATENT NO. : 10,769,187 B2
APPLICATION NO. : 16/694856
DATED : September 8, 2020
INVENTOR(S) : Braga et al.

It is certified that error appears in the above-identified patent and that said Letters Patent is hereby corrected as shown below:

On the Title Page

Item (56), in Column 2, in "U.S. Patent Documents", Line 3, delete "1,017,616" and insert -- 10,176,167 --.

Item (56), in Column 2, in "U.S. Patent Documents", Line 5, delete "1,019,905" and insert -- 10,199,051 --.

On the page 2, item (56), in Column 1, in "U.S. Patent Documents", Line 1, delete "1,022,306" and insert -- 10,223,066 --.

On the page 2, item (56), in Column 1, in "U.S. Patent Documents", Line 3, delete "1,052,860" and insert -- 10,528,605 --.

In the Specification

In Column 9, Line 15, delete "805):" and insert -- 805); --.

Signed and Sealed this
Thirtieth Day of August, 2022

Katherine Kelly Vidal
*Director of the United States Patent and Trademark Office*